United States Patent [19]
Schumer

[11] Patent Number: 5,593,075
[45] Date of Patent: Jan. 14, 1997

[54] PARKING GARAGE KEY OR DOCUMENT HOLDER

[76] Inventor: Donald A. Schumer, 1 Nightstepper Ct.- Condominium #310, Baltimore, Md. 21208

[21] Appl. No.: 505,160

[22] Filed: Sep. 19, 1995

[51] Int. Cl.$^6$ ...................................................... B60R 7/00
[52] U.S. Cl. ........................ 224/483; 224/277; 150/147; 206/555
[58] Field of Search ...................... 224/483, 277, 224/312, 676, 249, 911; 150/147; 264/322, 295, 339, DIG. 4, DIG. 66; 206/449, 555; 29/405, DIG. 3

[56] References Cited

U.S. PATENT DOCUMENTS

| | | |
|---|---|---|
| 1,463,619 | 7/1923 | Gardner. |
| 1,590,006 | 6/1926 | Werley. |
| 1,860,632 | 7/1929 | Stone ........................................ 224/277 |
| 3,027,995 | 4/1962 | Littman ...................................... 206/38 |
| 3,851,505 | 12/1974 | Wilkinson. |
| 3,881,338 | 5/1975 | Tischuk ................................. 29/DIG. 3 |
| 4,141,400 | 2/1979 | Mangan. |
| 4,948,022 | 8/1990 | VanDyke ................................... 224/483 |
| 5,358,019 | 10/1994 | Sumner, III ............................... 150/147 |

FOREIGN PATENT DOCUMENTS

| | | |
|---|---|---|
| 2638619 | 5/1990 | France. |
| 15255 | 6/1906 | Norway. |

*Primary Examiner*—Henry J. Recla
*Assistant Examiner*—Kam Shah
*Attorney, Agent, or Firm*—Richard C. Litman

[57] ABSTRACT

A holder for parking garage keys and rectangular documents is to be used for storing credit card sized pass-keys, credit cards and similarly dimensioned items inside motor vehicles. The holder has a fold-and-finish construction. The holder comprises a back face, a front face connected to the back face at the bottom of the holder, and two side faces connected to the back face at the sides. The front face has a substantial indentation and beveled top edge so as to allow easy access to the contents of the holder. The holder is intended to be mounted in an motor vehicle in order to provide ready availability of parking garage pass-keys or other cards or documents, such as credit cards and visas, that might be necessary while travelling by motor vehicle.

15 Claims, 3 Drawing Sheets

PARKING GARAGE KEY OR DOCUMENT HOLDER

BACKGROUND OF THE INVENTION

1. Field of the Invention

The present invention relates generally to receptacles, and more specifically to receptacles that can be constructed from one piece of material and to receptacles providing convenient accessibility to frequently accessed items.

2. Description of the Prior Art

Credit-card-sized pass-keys are increasingly common substitutes for keys. Unfortunately for people who use them, these pass-keys are so small as to be easily lost. This circumstance is particularly inconvenient when a vehicle driver is trying to get out of a parking garage, for example, and the driver cannot find the pass-key necessary to do so. The situation reaches nightmarish proportions in an all-too-familiar scenario, when an office-building-full of other drivers line up behind a front driver and angrily honk while the front driver searches frantically for a pass-key, trying to escape the other drivers' wrath. Various persons recognizing this problem have devised receptacles for cards and receptacles for use in vehicles; however, no such prior device has the simplicity of construction and ease-of-use existing in the present invention.

U.S. Pat. No. 1,463,619, issued to Prince A. Gardner, on Jul. 31, 1923, shows a card case having complex construction. This card case is not constructed from a single piece of material and there is no showing in this patent of mounting the card case in a vehicle for easy accessibility of a key card.

U.S. Pat. No. 1,590,006, issued to Marvin H. Werley, on Jun. 22, 1926, shows an identification card receptacle for automobiles, in which unlocking and locking of the receptacle occur simultaneously with ignition and stopping of ignition, respectively. Even when the receptacle is unlocked, access to contents of the receptacle is still difficult in comparison with the present invention. This card case is not constructed from a single piece of material and is not easily accessible when installed in a vehicle.

U.S. Pat. No. 3,851,505, issued to Lawrence H. Wilkinson, on Dec. 3, 1974, shows a card holder for vehicles, in which unlocking and locking of the receptacle occur simultaneously with ignition and stopping of ignition, respectively. This card holder requires that a card used with the holder have a central aperture, and hence is unsuitable for use with conventional key cards that have no such aperture. Moreover, this card case is not constructed from a single piece of material.

U.S. Pat. No. 4,141,400, issued to James H. Mangan, on Feb. 27, 1979, shows a protective holder for magnetic cards comprised by a pair of thin plates, one of the plates having projecting ribs. This card case is not constructed from a single piece of material and there is no showing in this patent of mounting the card case in a vehicle for easy accessibility of a key card.

French Patent Document No. 2 638 619, issued to Wen Chi Hu, on May 11, 1990, shows a card holder for magnetic cards. This holder has two rigid layers and, optionally, a woolen covering. One side of this holder has a thicker inner width as compared to an inner width of a remaining side. There are two indentations apparently for easier gripping of a card in this holder. There is no indication in this patent that this holder is constructed from a single piece of material in the manner of the present invention, nor that the holder should be used in a vehicle for easy access to a key card.

Norwegian Patent Document No. 15255, issued to Boghandler Gustav Kaufmann, on Jun. 5, 1906, shows a receptacle for flat, rectangular items having two indentations apparently for easier gripping of a card in this holder. There is no indication that the holder in this patent is constructed in the same manner as is the present invention.

None of the above inventions and patents, taken either singly or in combination, is seen to describe the instant invention as claimed.

SUMMARY OF THE INVENTION

A holder for parking garage keys and rectangular documents, according to the present invention, is to be used for storing credit card sized pass-keys, credit cards and similarly dimensioned items inside motor vehicles. The holder has a simple inexpensive fold-and-finish construction. The holder comprises a back face, a front face connected to the back face at the bottom of the holder, and two side faces connected to the front and back faces at the sides. The front face has a substantial indentation and beveled top edge so as to allow easy access to the contents of the holder. The holder is also intended to be mounted in an motor vehicle in order to provide ready availability of parking garage pass-keys or other cards or documents, such as credit cards and visas, that might be necessary while travelling by motor vehicle.

Accordingly, it is a principal object of the invention to provide storage for flat, generally rectangular objects, such as magnetic pass-keys.

It is another object of the invention to allow easy retrieval of objects stored in a receptacle.

It is a further object of the invention to ensure accessibility of a magnetic pass-key in an motor vehicle.

Still another object of the invention is to avoid loss of a magnetic pass-key.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2A is a side elevational view of the present invention when in a folded configuration.

Similar reference characters denote corresponding features consistently throughout the attached drawings.

DETAILED DESCRIPTION OF THE PREFERRED EMBODIMENTS

Figure 1:
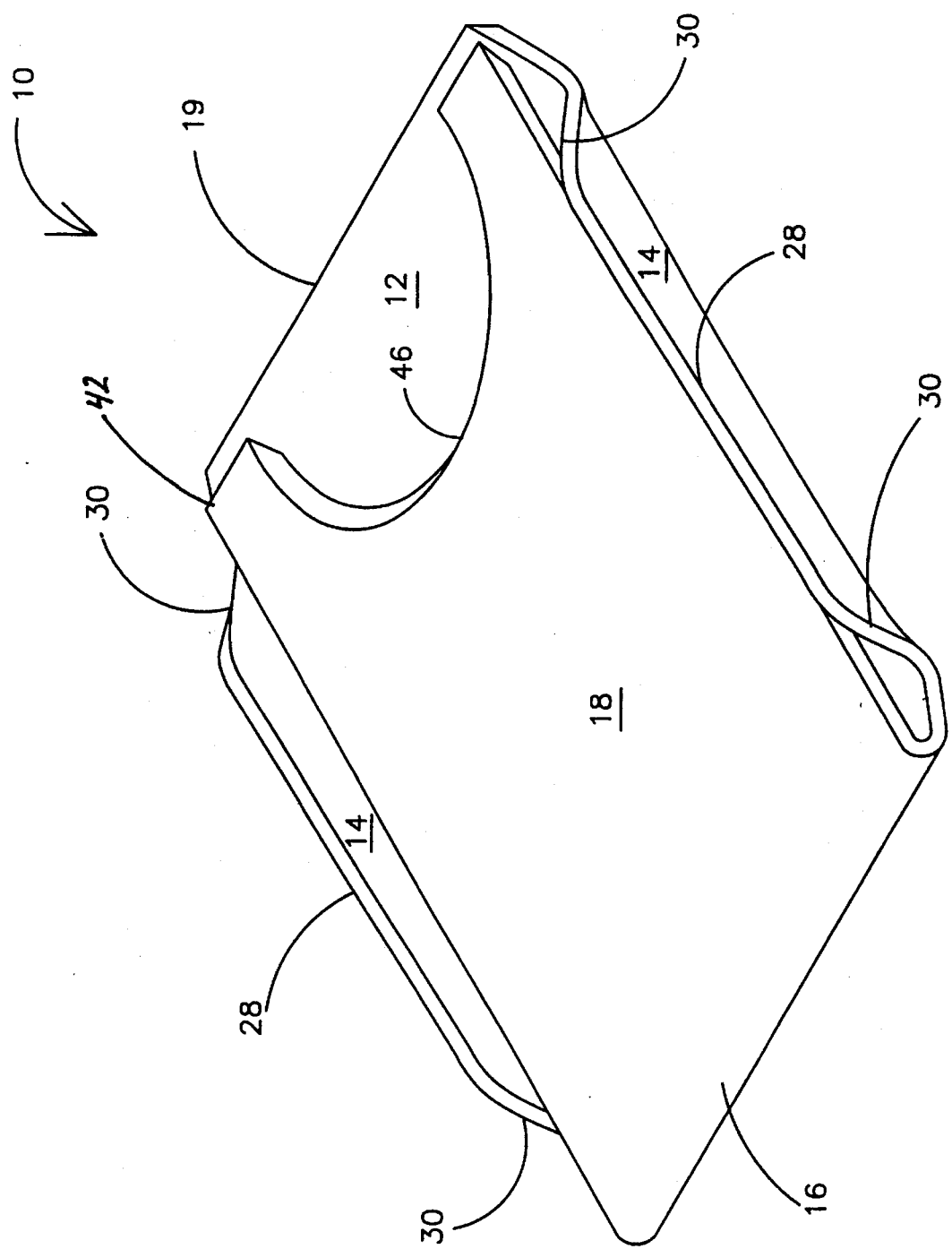
FIG. 1 is an environmental, perspective view of the present invention when in a folded configuration.

The present invention provides a one-piece blank that is inexpensive to manufacture and is easily configured, by folding, into an easy-to-use receptacle for magnetic pass-keys.

Referring to the drawings, a holder 10 for parking-garage keys and rectangular documents such as credit cards, according to the present invention, comprises a rectangular back face 12, two side faces 14, a bottom face 16 and a front face 18. The back face 12 is rectangular and has a top edge 19, a bottom region 20, a first side region 22, and a second side region 24. The holder 10 is preferably composed of a selectively bendable, resilient, durable material, such as thermoplastics and spring metals. The material chosen is preferably 1/16 to 1/32 inches in thickness, and should be non-ferrous and non-magnetic, so as not to damage the magnetic strip present on typical garage pass-keys.

The two side faces 14 are trapezoidal, each having a long-length side 26, a medium-length side 28, and two short-length sides 30, one of the long-length sides 26 joined to the first side region 22 at a first side crease-line 34, and another one of the long-length sides 26 joined to the second side region 24 at a second side crease-line 38. The trapezoidal shape of the side faces 14 is very important, insofar as it prevents contents of the holder 10 from falling out unintentionally, without obstructing access to the holder 10 or its contents.

Figure 2:
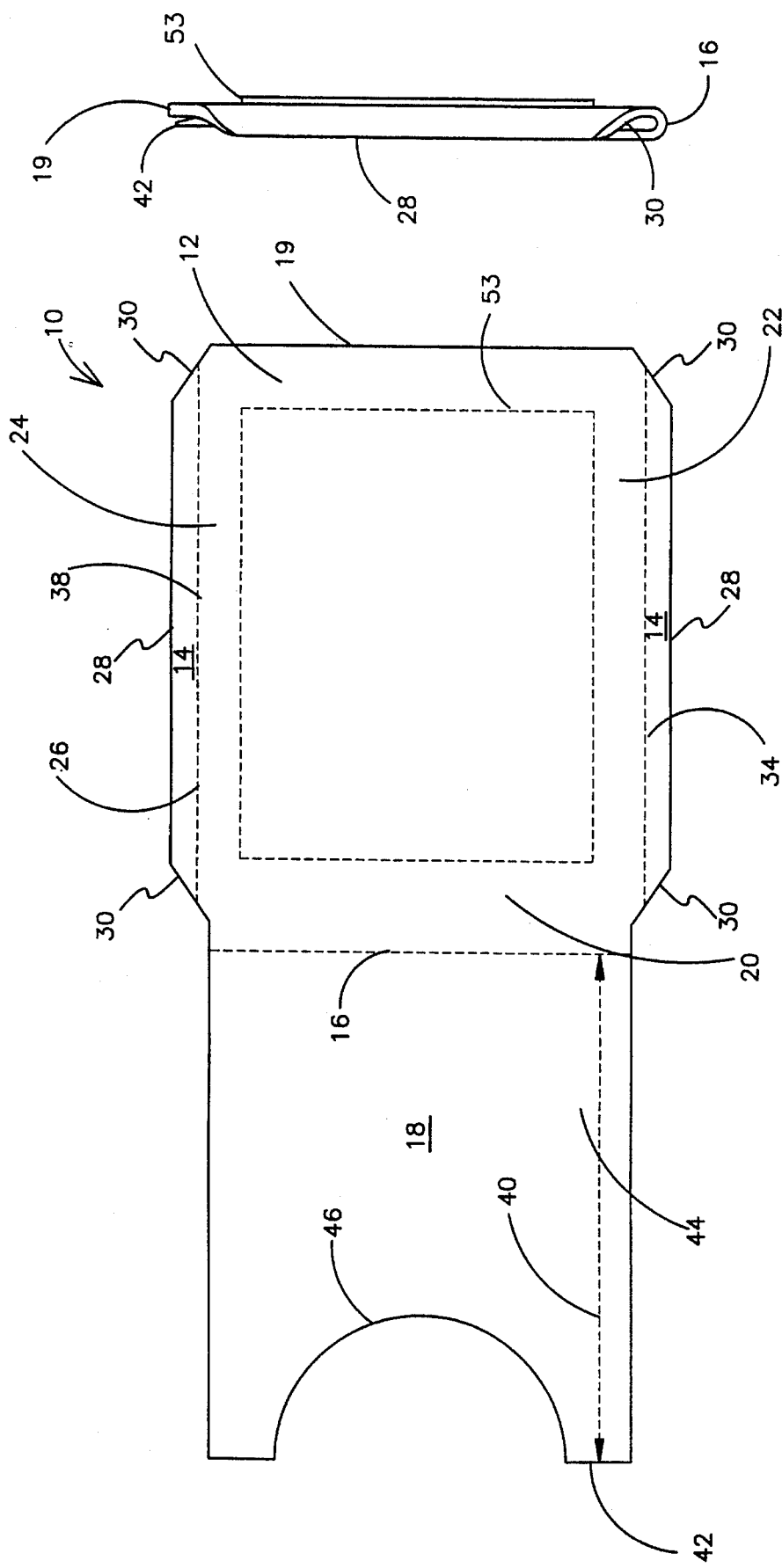
FIG. 2 is a top plan view of the present invention when in an unfolded configuration.
Figure 3:
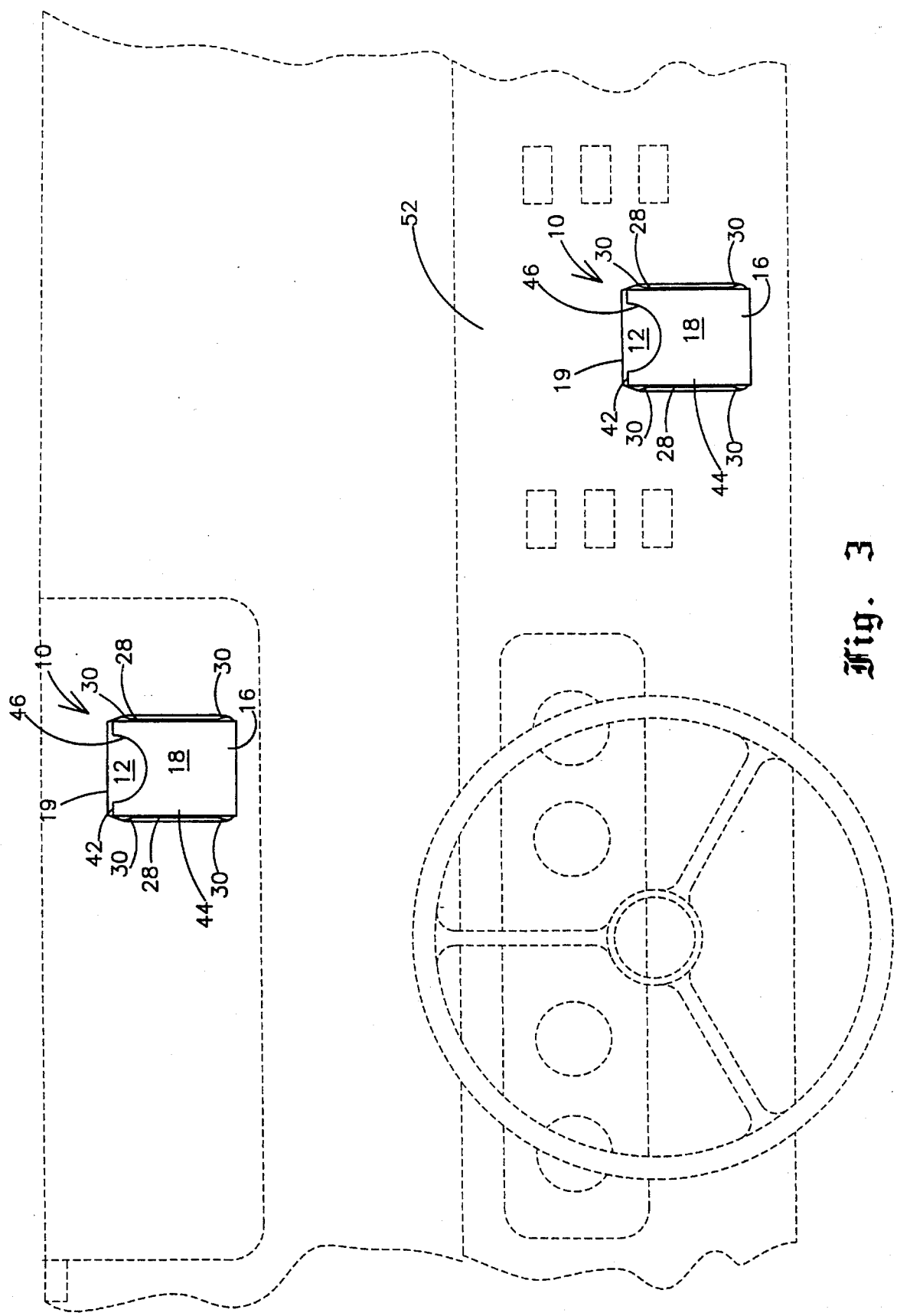
FIG. 3 is an environmental, perspective view of the present invention when in a folded configuration and mounted at a back face.

The front face 18 is generally rectangular, having a predetermined length 40 preferably about as long as a conventional credit card, a top edge 42, and a bottom region 44, the top edge 42 of the front face 18 having a notch 46 extending into one-eighth to one-half of the length 40 of the front face 18. Importantly, the top edge 42 is beveled, as shown in FIG. 2A, to ensure ready insertion of and access to contents of the holder 10, when the holder 10 is configured in a finished form, as shown in FIGS. 3.

The bottom face 16 is rounded and rectangular and joins the bottom region 20 of the back face 12 and the bottom region 44 of the front face 18. When the holder 10 is configured for use, the side faces 14 are oriented at a normal angle relative to the back face 12, and the back face 12 and the front face 18 are oriented at a normal angle relative to the bottom face 16. The back face 12 and the front face 18 are then oriented opposite to one another. For advantageous storing of garage pass-keys, it is desirable that, after folding of the holder 10, the back face 12 be mounted to an interior portion 52 of a vehicle, such as a dashboard or visor, preferably by use of double-faced adhesive tape 53, although other mounting means could be used, such as hook-and-loop fasteners, adhesives, snaps, suction cups, buttons, hooks, and single-faced tape.

In use of the holder 10 for parking-garage keys and rectangular documents, the holder is configured into its folded form by heating and the medium-length sides 28 of the side faces 14 and the front face 18, into the finished, folded configuration. Advantageously, no bonding is required, thus simplifying construction and minimizing expenses of manufacture. Typically, this folding will be accomplished before the holder 10 reaches the consumer, with the adhesive 53 covered by a protective covering (not shown). In this way, the holder 10 can simply be mounted on a vehicle dash board, ready for use, as shown in FIG. 3. For ease of use, mounting is preferably on the back face 12, as shown in FIG. 3. Credit cards and credit-card-sized pass-keys are then inserted between the front face 18 and the back face 12. Resiliency of the material of which the holder 10 is constructed tends to press the front face 18 and the back face 12 together, thereby securing contents of the holder 10. Simultaneously, the indentation 46 allows for easy removal of the contents of the holder 10. A number of documents that the holder 10 can functionally hold increases as dimensions to which the holder 10 is constructed increase.

It is to be understood that the present invention is not limited to the sole embodiment described above, but encompasses any and all embodiments within the scope of the following claims.

I claim:

1. A holder for parking-garage keys and rectangular documents, comprising:

a rectangular back face having a top edge, a bottom region, a first side region, and a second side region;

two trapezoidal side faces each having a long-length side, a medium-length side, and two short-length sides, one of said long-length sides joined to said first side region at a first side crease-line, and another one of said long-length sides joined to said second side region at a second side crease-line;

a generally rectangular front face having a length, a top edge, side edges and a bottom region, said top edge of said front face having a notch extending into one-eighth to one-half of said length of said front face; and a rounded rectangular bottom face joining said bottom region of said back face at a back crease-line and said bottom region of said front face at a front crease-line.

2. The holder for parking-garage keys and rectangular documents according to claim 1, wherein said side faces are oriented at a normal angle relative to said back face.

3. The holder for parking-garage keys and rectangular documents according to claim 1, wherein said back face and said front face are oriented at a normal angle relative to said bottom face.

4. The holder for parking-garage keys and rectangular documents according to claim 1, wherein said back face and said front face are oriented opposite to one another.

5. The holder for parking-garage keys and rectangular documents according to claim 1, wherein:

said side faces are oriented at a normal angle relative to said back face;

said back face and said front face are oriented at a normal angle relative to said bottom face; and said back face and said front face are oriented opposite to one another.

6. The holder for parking-garage keys and rectangular documents according to claim 5, wherein said back face is mounted to an interior portion of a vehicle.

7. The holder for parking-garage keys and rectangular documents according to claim 5, wherein the holder is composed of a resilient material selected from thermoplastics and spring metal.

8. The holder for parking-garage keys and rectangular documents according to claim 1, wherein medium-length sides of said side faces are configured adjacent to side edges of said front face.

9. The holder for parking-garage keys and rectangular documents according to claim 1, wherein said back face is mounted to an interior portion of a vehicle.

10. The holder for parking-garage keys and rectangular documents according to claim 1, wherein said top edge of said front face is beveled.

11. A holder for parking-garage keys and rectangular documents, comprising:

a rectangular back face having a top edge, a bottom region, a first side region, and a second side region;

two trapezoidal side faces each having a long-length side, a medium-length side, and two short-length sides, one of said long-length sides joined to said first side region at a first side crease-line, and another one of said long-length sides joined to said second side region at a second side crease-line;

a generally rectangular front face having a length, a top edge, side edges and a bottom region, said top edge of said front face being beveled and having a notch extending into one-eighth to one-half of said length of said front face;

a rounded rectangular bottom face joining said bottom region of said back face at a back crease-line and said bottom region of said front face at a front crease-line;

said side faces are oriented at a normal angle relative to said back face;

said back face and said front face are oriented at a normal angle relative to said bottom face; and said back face and said front face are oriented opposite to one another.

12. A method of constructing a holder for parking-garage keys and rectangular documents, comprising the steps of:

shaping a flat piece of material selected from thermoplastic and spring metal having a rectangular back face having a top edge, a bottom region, a first side region, and a second side region, two trapezoidal side faces each having a long-length side, a medium-length side, and two short-length sides, one of said long-length sides joined to said first side region at a first side crease-line, and another one of said long-length sides joined to said second side region at a second side crease-line, a generally rectangular front face having a length, a top edge, side edges and a bottom region, said top edge of said front face having a notch extending into one-eighth to one-half of said length of said front face, a rectangular bottom face joining said bottom region of said back face at a back crease-line and said bottom region of said front face at a front crease-line;

applying means for imbuing reversible pliability to the bottom face;

configuring said side faces to be oriented at a normal angle relative to said back face;

configuring said back face and said front face to be oriented opposite to one another with said bottom face configured to be rounded; and ending application of means for imbuing reversible pliability to the bottom face.

13. The method according to claim 12, wherein the means for imbuing reversible pliability is heat.

14. The method according to claim 12, wherein the top edge of the front face is beveled.

15. The method according to claim 12, whereby the holder is attachable to an interior portion of a vehicle.

* * * * *